United States Patent
De Meerleer

(10) Patent No.: US 7,364,313 B2
(45) Date of Patent: Apr. 29, 2008

(54) MULTIPLE IMAGE PROJECTION SYSTEM AND METHOD FOR PROJECTING MULTIPLE SELECTED IMAGES ADJACENT EACH OTHER

(75) Inventor: Peter De Meerleer, Oosterzele (BE)

(73) Assignee: Barco N.V., Kortrijk (BE)

( * ) Notice: Subject to any disclaimer, the term of this patent is extended or adjusted under 35 U.S.C. 154(b) by 124 days.

(21) Appl. No.: 10/979,656

(22) Filed: Oct. 11, 2004

(65) Prior Publication Data

US 2005/0117121 A1    Jun. 2, 2005

Related U.S. Application Data

(63) Continuation-in-part of application No. 10/330,943, filed on Dec. 27, 2002, now Pat. No. 6,848,792.

(51) Int. Cl.
G03B 21/26    (2006.01)
G09G 5/00    (2006.01)

(52) U.S. Cl. ............... 353/121; 353/94; 345/1.3

(58) Field of Classification Search ............. 353/21, 353/30, 34, 94, 121; 348/739, 840; 382/175, 382/256; 345/623, 624, 629, 650, 761, 778, 345/1.1, 1.3
See application file for complete search history.

(56) References Cited

U.S. PATENT DOCUMENTS 6,195,068 B1 * 2/2001 Suzuki et al. .............. 345/2.2
6,392,717 B1 * 5/2002 Kunzman ................... 348/744
6,538,675 B2 * 3/2003 Aratani et al. .............. 715/856
6,614,439 B2 * 9/2003 Matsumoto et al. ........ 345/530
6,856,304 B1 * 2/2005 Hirakata et al. ............. 345/32
6,859,236 B2 * 2/2005 Yui ............................. 348/584
2002/0093626 A1 * 7/2002 Asamura ..................... 353/30
2004/0113935 A1 * 6/2004 O'Neal et al. .............. 345/732

* cited by examiner

*Primary Examiner*—Andrew T. Sever
(74) *Attorney, Agent, or Firm*—Barnes & Thornburg LLP

(57) ABSTRACT

The present invention provides a projection device comprising: at least two input channels for receiving at least a first and a second input image signal, an image recombination system for combining the input image signals into one imaging signal, an input port for receiving user inputs, a processing unit adapted for running an operating system, the operating system being for commanding the image recombination system in accordance with received user inputs, an image forming display device for displaying an image corresponding to the imaging signal, and a projection lens for projecting the imaging signal onto a visualisation surface. In other aspects, the present invention also provides a projection system comprising such projection device, and a method for projecting multiple images adjacent each other. It is an advantage of the present invention that, due to the use of an operating system in the projection device, a user-friendly source selection capability is offered.

25 Claims, 8 Drawing Sheets

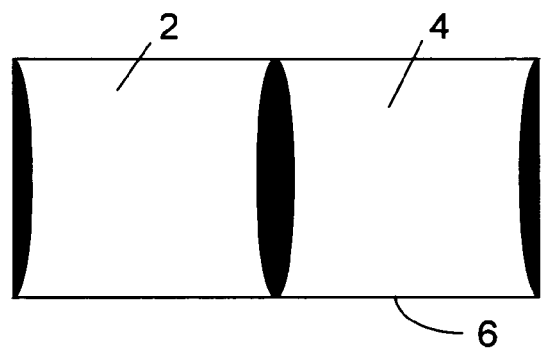
Fig. 1 – PRIOR ART
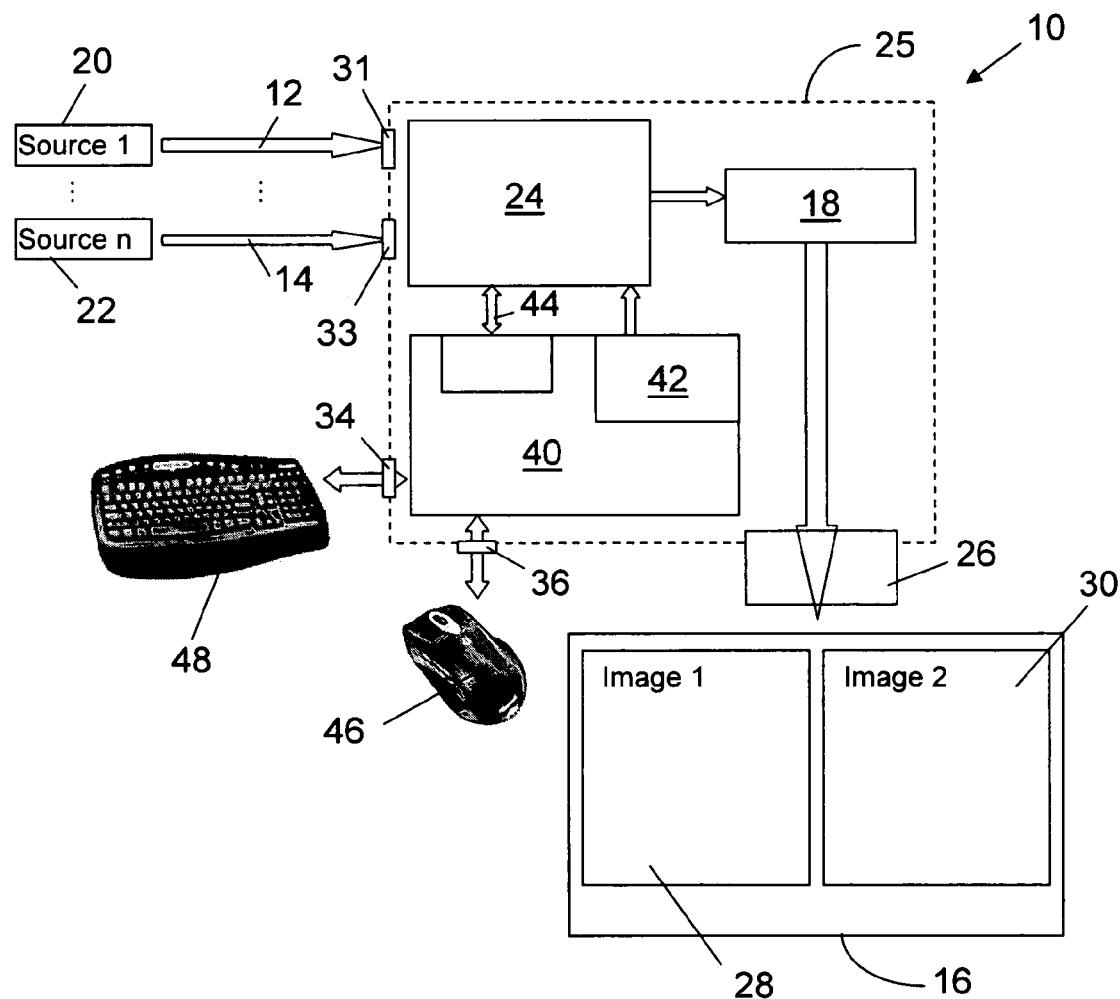
Fig. 2

MULTIPLE IMAGE PROJECTION SYSTEM AND METHOD FOR PROJECTING MULTIPLE SELECTED IMAGES ADJACENT EACH OTHER

RELATED APPLICATION

This application is a continuation-in-part of U.S. patent application Ser. No. 10/330,943, filed Dec. 27, 2002, now U.S. Pat. No. 6,848,792.

TECHNICAL FIELD OF THE INVENTION

The present invention relates to a projection device and a method for projection of a plurality of images adjacent each other onto a visualisation surface such as a screen, especially using fixed format display devices. More particularly it relates to a desktop-integrated method for selecting a plurality of sources to be displayed. The method and device of the present invention may be applied to a high resolution display system.

BACKGROUND OF THE INVENTION

Projection technology is becoming wide spread thanks to rapid technology evolution and more efficient production techniques. Reference is made to the book "Projection Displays", E. H. Strupp and M. H. Brennesholtz, Wiley, 1999.

Current commercially available projectors can only project one computer or data image in its native resolution if it is a high resolution image such as for example SVGA (Super VGA or Super Video Graphics Array or Adaptor, 800*600 pixels), XGA (Extended Graphics Array or Adaptor, 1024*768 pixels), 16:9 HDTV standard format (1280*720 pixels), SXGA (Super XGA, 1280*1024 pixels), Wide XGA (1365*768 pixels), SXGA+ (1400*1050 pixels), UXGA (Ultra XGA, 1600*1200 pixels), 16:9 HDTV standard format (1920*1080 pixels), 16:10 widescreen PC displays (1920*1200 pixels), 16:9 European HDTV format (2048*1152 pixels) or Quad XGA (2048*1536 pixels). Reference is made to the book "Display Interfaces", R. L. Myers, Wiley, 2002, for explanation of these terms.

When it is desired to project multiple computer or data images on one screen in native resolution, e.g. images from two laptop computers in order to be able to compare them, then often one projector per displayed image is used. This solution is expensive because of the cost of supplementary projectors. Furthermore, it brings along additional problems, the most important of which are geometrical alignment of the different images and colour adjustment of these images projected by different projectors.

The geometrical alignment forms a problem because each projector has its own projection lens with its own geometrical aberrations or distortions. Projecting a plurality of such distorted images adjacent each other always involves some bad alignment, as represented for example in FIG. 1, which shows two images 2, 4 projected adjacent each other onto a projection surface 6 by two different projectors. Each of the images 2, 4 is distorted.

The book by Myers above proposes a hypothetical solution to the problem of displaying images of different resolution on a single display by means of conditional updating. That is each sub-image has to be updated separately rather than the complete screen as an entity.

When images of different projectors are combined, furthermore these images need to be colour adjusted so that originally colour matched images look the same, since the projected image of each projector has a slightly different colour point and colour uniformity. Even with the best possible known colour compensation schemes, one can always notice a visible difference. Because of colour drift of projectors over time, this difference can get bigger over time.

When a plurality of images are projected by means of a single projector, such as for example projection of high-resolution images adjacent each other as described in the parent application U.S. Ser. No. 10/330,943 of the present CIP, a selection of image sources of which the images are to be projected may need to be performed. No user-friendly way for doing this is currently available.

U.S. Pat. No. 6,493,008 describes a multi-screen display system and method which enables the simultaneous display of image data inputted from a plurality of image sources on a display unit, and which unifies the control relating to each image on a multi-screen. The multi-screen display system receives images from a plurality of image sources, and displays the received images at the same time on the multi-screen of a display device. In the multi-screen display system, a multi-screen control part determines a type of each image source and a display region where a multi-screen control cursor is positioned on the multi-screen. The multi-screen control part determines a role of the multi-screen control cursor in the display region according to the type of the image source of an image displayed in the display region where the multi-screen control cursor is positioned. The multi-screen control part controls generation of the multi-screen control cursor and the operation thereof so that the multi-screen control cursor can play the determined role. That system described works with a by a workstation generated on-screen display (OSD), which the user has to know. It is necessary to generate an additional OSD through the PC or workstation, on which then can be clicked, e.g. through a remote control, to change properties of the selected images. A broadcasted scenario is needed for generating the interaction means. It is known that OSDs are becoming increasingly complex, which may make it difficult for a user to select and handle a few of a plurality of input sources for combined display of images onto a single screen.

In projection devices for simultaneous projection of data from at least two input sources selected from a plurality of input sources, it is desirable to have a user-friendly selection capability, as often it is possible to connect a lot of computer, data and/or video sources (e.g., but not limited to, up to 20 different input sources), while only displaying a couple of them. In this case, a user-friendly method of selecting these different inputs is very important, in particular for ordinary, non-specialised user. At present, such user-friendly selection capability is not present.

SUMMARY OF THE INVENTION

It is an object of the present invention to provide a multiple image projection system for projecting two or more discrete images adjacent each other onto a viewing surface without substantial illumination discontinuities or image distortions between both images, the image projection system having a user-friendly image source selection capability.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

In a fist aspect, the present invention provides an integrated projection device. With an integrated projection device is meant a projection device of which separate components are formed into a whole, for example by enclosing them by a single housing, or, in case of e.g. modular set-ups, by enclosing them in separated housings which are connected onto each other in any suitable way, e.g. by clicking them on one another. Such integrated projection device comprises:

at least two first input ports for receiving at least a first and a second input image signal,
an image recombination system for combining the input image signals into one imaging signal,
a second input port for receiving user inputs,
a processing unit adapted for running an operating system, the operating system being for directly or indirectly commanding the image recombination system in accordance with received user inputs,
an image forming display device for displaying an image corresponding to the imaging signal, and
a projection lens for projecting the imaging signal onto a visualisation surface.

At least one of the first input ports may be a high resolution input port, for receiving a high resolution input image signal. The input image signals may be high resolution input image signals, e.g. they may have a resolution SVGA, XGA, SXGA+, HDTV or higher. The input image signals may be obtained from input sources which may be anolog sources, digital sources, or which can be distributed over a network through desktop sharing or file transfer.

The image recombination system may combine input image signals, of which in particular e.g. at least one high resolution input image signal, into a high resolution imaging signal.

The image forming display device may be a high resolution image forming display device, which is necessary in case a high resolution imaging signal is to be displayed. The image forming display device may comprise a number of monochromatic image forming display devices which in combination form a projected coloured image. The image forming display may be made up of one or more fixed format devices.

The processing unit may comprise a processor, a memory, a storage device such as e.g. a hard disc, a flash card or a RAM card, and/or a graphical output device. The processing unit may furthermore comprise a link for communicating with the image recombination system. This link may be any of a serial link, a parallel link or an Ethernet link The processing unit may consist of a single board computer or it may comprise multiple boards.

The operating system may for example be Windows based or Unix based.

The image recombination system may comprise an image recombination processing unit for receiving commands from the processing unit and for commanding the image recombination system.

In a projection device according to the present invention, the first and second input image signals, e.g. high resolution input image signals, may have information data for a first and a second display format, respectively, the first and the second display format comprising a first and a second image format respectively, and the imaging signal, e.g. high resolution imaging signal, may have information data for a third display format, the third display format comprising a third image format. The first and second image formats may be the same or they may be different. The first and second display formats may be the same, or they may be different. They may have the same or a different frame rate. The frame rate of the third display format may be the same as that of either of the first of second display formats, or it may be different from both. The third frame rate is preferably a single frame rate for the complete image thus avoiding the necessity for conditional updating. The third image format may be, but does not need to be, larger than either the first or second image format. The third image format may be at least the summation of the first and second image formats.

The image forming display device may be a wide aspect ratio panel, e.g. a flat panel display. It may be a transmissive display such as e.g. an LCD panel, or a reflective display such as e.g. a DMD or an LCOS, or a transreflective display.

The image recombination system may comprise a Field Programmable Gate Array or other similar computing device.

In a second aspect, the present invention provides a projection system with a projection device and a visualisation surface. The projection device of such projection system comprises:

at least two first input ports for receiving at least a first and a second input image signal,
an image recombination system for combining the input image signals into one imaging signal,
a second input port for receiving user inputs,
a processing unit adapted for running an operating system, the operating system being for directly or indirectly commanding the image recombination system in accordance with received user inputs,
an image forming display device for displaying an image corresponding to the imaging signal, and
a projection lens for projecting the imaging signal onto a visualisation surface.

A projection system according to the present invention may furthermore comprise an input device, such as e.g. a mouse, a keyboard and/or a keypad, for inputting user inputs. The input device may be connected to the processing unit by a wired connection, a wireless connection, an Ethernet connection, or through desktop-sharing.

The first and second input image signals may have a first and a second image format, respectively, and the high-resolution imaging signal may have a third image format. The first and second image formats may be the same and the first and second display formats may be the same. The third image format may be, but does not need to be, larger than either the first or second image formats.

In a third aspect, the present invention provides a method for projecting multiple, i.e. at least two, images adjacent each other. The method comprises:

receiving a user input,
selecting at least a first and a second input image signal in accordance with a received user input,
running an operating system for commanding input image signal combining means for combining the selected input image signals into one imaging signal, running an application for manipulating the input image signals in accordance with the received user input,
applying the imaging signal to a image forming display device, so as to obtain an intensity-modulated light beam corresponding to the imaging signal, and
projecting the intensity-modulated light beam onto a projection surface.

Running the operating system may comprise running a Windows based or Linux based operating system.

A method according to the present invention may furthermore comprise projecting an operating system environment onto the projection surface.

In a fourth aspect, the present invention provides a processing unit for use with a projection device, the projection device comprising means for receiving at least a first and a second input image signal, an image recombination system for combining the input image signals into one imaging signal, an image forming display device for displaying an image corresponding to the imaging signal, and a projection lens for projecting the imaged imaging signal onto a visualisation surface, the processing unit being adapted for controlling the combining of the input image signals in accordance with received user inputs by running an operating system and an application program.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1 is a schematic front view of adjacent images projected by two different projectors according to the prior art.

FIG. 2 is a block schematic diagram of a projection system according to an embodiment of the present invention.

Figure 3:
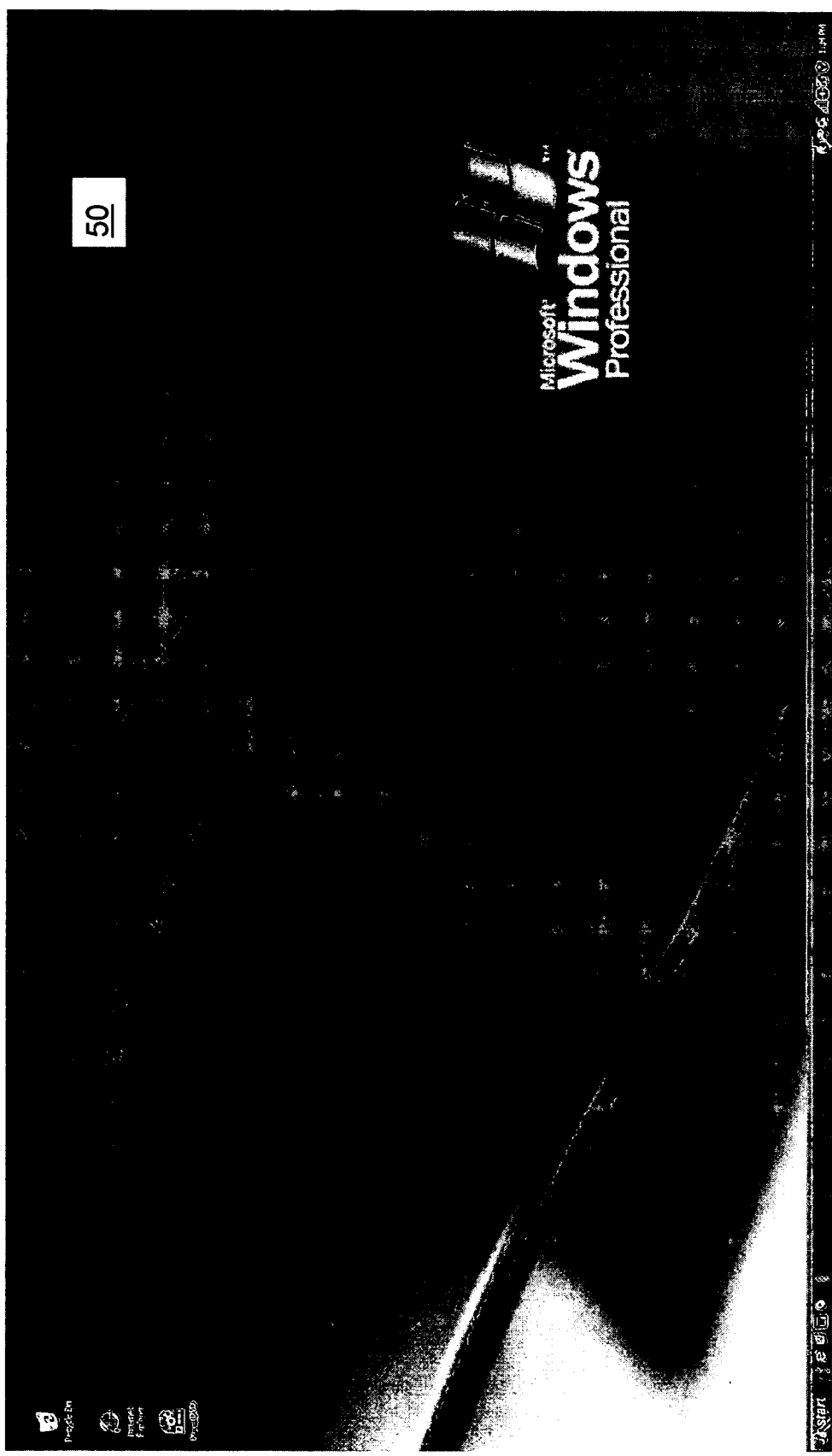
FIG. 3 shows a displayed image before input sources are selected, the image only showing the operating system environment.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

The present invention provides a single projection system that may comprise one or more projection devices 10 and that has at least two input channels 12, 14. The input channels 12, 14 may, but do not need to be, high resolution input channels. The projection device 10 is able to capture input image signals, e.g. high-resolution input image signals, relating to two or more data or computer images. The term "resolution" in the context of display interfaces is often used to refer to the "image format" or "addressability", i.e. the horizontal and vertical pixel count in a fixed format device. Thus, in the attached claims the term "image format" refers what is called "resolution" in the art, i.e. the number of pixels in the vertical and horizontal direction. The term "display format" includes not only the image format but also other information required to display the image, e.g. the frame rate, the blanking periods. Each image signal has information relating to the length of the lines of the image as well as information from which it can be decided which parts of the image signals are image pixels to be displayed. This type of information is contained in the image signals received on the first and second channels and can be, for example, blanking periods for a first and second display format, respectively. The first and second display format may be the same. A complete video signal, whether analog or digital, includes information corresponding to the image itself, but also generally has additional "overhead" requirements. In the situation of an analog video signal, the "overhead" is in the blanking period, i.e. that portion of the signal that is intentionally left free of active content, or of information corresponding to a part of the image itself. The requirement for such periods is imposed by the needs of the various imaging and display hardware technologies, which must have some idle time between each scanned line and frame or field in order to reset and prepare for the next. The blanking period almost always contains the signals which provide synchronisation information to the display—those pulses or signals which identify the start of a new line, field or frame. It is common, then, to divide the overall blanking period into three sections. The period prior to the synchronisation pulse is the "front porch". The remainder of the blanking period is then divided into the sync pulse itself and the "back porch" (which is any remaining blanking time following the end of the sync pulse). It is common in analog video signal and timing standards to use either the beginning of the blanking period or the beginning of the sync pulse itself as the reference point from which the rest of the line or frame timing is defined. In the case of digital video systems, there is often no need for an explicit blanking period, as the information will be placed in a digital storage and/or further processed before being delivered to the display itself. However, many "digital" video systems and standards are based on the assumption that an analog signal will be "digitised" in order to create the digital data stream, and so include definitions of the blanking period, sync pulse position, etc., in terms of the sample or pixel period. Doing away with such things entirely, and treating the image transmission as if it were any other digital data communication, is generally not done. In cases where it is not done, the "overhead" will be in an information data part of the image signal, which for example defines the number of pixels per line for the image, and/or the frame rate, i.e. the number of images that are displayed per second. This information data then refers to the image format. In the present document, the term "information data" is used both for analog and digital image signals, and thus includes either blanking periods or other information data relating to the way the image format is to be displayed on a particular device. This is to be distinguished from "image data" that contains the information with respect to each image pixel to be displayed.

The table below provides a list of image and display formats as well as details of timing specifications.

| Format | Htotal | H FP | HS | H BP |
|---|---|---|---|---|
| VGA 640 × 480 | 800 | 16 | 96 | 48 |
| SVGA 800 × 600 | 1056 | 40 | 128 | 88 |
| XGA 1024 × 768 | 1344 | 24 | 136 | 160 |
| 16:9 HDTV 1280 × 720 | 1650 | 70 | 80 | 220 |
| SXGA 1280 × 1024 | 1688 | 48 | 112 | 248 |
| UXGA 1600 × 1200 | 2160 | 64 | 192 | 304 |
| 16:9 HDTV 1920 × 1080 | 2200 | 45 | 88 | 148 | wherein
Htotal is the total duration of one line, in pixels,
H FP is the horizontal "front porch" duration, in pixels,
HS is the horizontal sync pulse duration, in pixels, and
H BP is the horizontal "back porch" duration, in pixels.

It can be seen from the table above that different blanking periods are provided for different display formats, i.e. images have a blanking period suitable for a certain display format.

With "high resolution" is meant having four hundred thousand pixels or more, preferably one million pixels or more, more preferred two million pixels or more.

A projection device 10 according to the present invention is an integrated projection device, which means that its components are assembled so as to form a whole. Preferably, the components of a projection device 10 according to the present invention are integrated into one single housing 25, as illustrated in FIG. 2. Alternatively, in particular in case of a modular set-up, components of the projection device 10 may be assembled into a plurality of housings which are then connected and fixed onto each other in any suitable way, e.g. by clicking, gluing or screwing. The projection device 10 or the housing 25 thereof is provided with at least two first input ports 31, 33 for receiving input image signals corresponding to images to be displayed. The input image signals each correspond to a complete image, i.e. an input image signal corresponds to a monochromatic image in case of the projection device 10 being a monochromatic projection device, or it corresponds to a full colour image in case of the projection device 10 being a colour projection device. In particular, an image input signal may comprise image information relating to a plurality of primary colour images. At the at least two first input ports 31, 33 a connector of any suitable type is provided for connecting cables carrying image signals from sources 20, 22 to the input ports 31, 33. The connectors may for example be, although not limited thereto, video connectors, RGBHV connectors, BNC connectors, (mini) DIN connectors or any other suitable connectors. It is possible to provide different connectors at different first input ports, for receiving different types of input image signals.

The projection device 10 according to the present invention is able to display these data or computer images, in native resolution or in a reduced resolution, next to or adjacent each other, as shown in FIG. 2, and therefore has an image recombination system 24 for combining the input image signals 20, 22 into one imaging signal having data information, e.g. blanking periods, for a third display format. The third display format may be, but does not need to be, larger than either of the first or second display formats.

Combination of the input image signals 20, 22 is performed in accordance with user input signals. The projection device 10 or the housing 25 thereof is provided thereto with at least one second input port 34, 36 for receiving user input signals corresponding to instructions from a user. At the at least one second input port 34, 36 a connector of any suitable type, for example, but not limited thereto, a USB connector, a PS/2 connector or a serial connector, may be provided for connecting a cable carrying a user input signals from a pointing device 46, 48 to the second input port 34, 36. Alternatively, the at least one second input port 34, 36 may be an infrared port for wirelessly receiving user input signals. It is possible to provide different connectors at different second input ports, for receiving different types of user input signals.

The housing of the projection device 10 furthermore includes a processing unit adapted for running an operating system, the operating system being for commanding the image recombination system 24 in accordance with the received user inputs.

The projection device 10 furthermore comprises an image forming display device 18, e.g. a high-resolution image forming display device, for displaying an image corresponding to the imaging signal. The projection device 10 may comprise more than one monochromatic image display devices 18, e.g. three such devices for projecting three primary colour images. In accordance with the present invention the combination of the two input images is displayed from each monochromatic image display device 18. The three images are superimposed on a display screen 16 to form a single full-colour image that comprises the two input images. The display devices may be fixed format display devices, e.g. flat panel devices and may include tiled displays.

A projection device 10 according to the present invention preferably comprises a single power connector for connection to a power source. The processing unit and the other projection device electronics are preferably fed from the same power source through one and the same power connector.

The present invention also provides a projection system, comprising a projection device 10 and a visualisation screen 16.

As an example, hereinafter a description is given for a high-resolution projection device 10, for projecting two high-resolution images in native resolution adjacent each other. However, the invention is not limited thereto, and also comprises projection devices for projecting multiple, i.e. two or more, low-resolution images adjacent each other, and/or for projecting multiple high-resolution images in a reduced resolution adjacent each other, and/or for projecting combinations of the above kind of images, As an example, a projection system according to the present invention may comprise a fixed format projector, e.g. a flat panel projector such as an LCD projector as a projection device 10. Such an LCD projector may have three image forming display devices 18, e.g. the LCD projector may be a three-panel (one panel for each colour) LCD projector, wherein each panel has a "resolution" of e.g. 2050*1208 pixels. This corresponds to the resolution of two standard XGA panels next to each other. The aspect ratio of the image forming display devices 18, e.g. LCD panels, may be larger than the aspect ratio of a normal image forming display device, e.g. LCD panel, for example the aspect ratio may be 16:9 or 16:10 instead of 4:3. The projection device may be, but does not need to be, a two-lamp projector, which fits better with the 16:9 or 16:10 aspect ratio of the image forming display devices 18. Thanks to the resolution of the image forming display panels 18, in the example given it is possible to display two native XGA-sources of each 1024*768 pixels next to each other simultaneously without the need for two projectors. In such a case the frame rate for the complete image is the same all over the image.

In order to achieve the display of two native high-resolution images adjacent each other, special electronics are needed. The electronics inside the projection device 10 are capable of handling two or more separate data streams 20, 22 and of combining them, in particular for the present example in full resolution, in an image recombination system 24 into one image format that is then sent to the image forming display device 18 inside the projection device 10, as shown on the example in FIG. 2.

The data streams or input image signals 20, 22 may for example be analog R, G, B, H, V signals or digital DVI-signals or equivalent with a resolution of VGA, SVGA, XGA, SXGA+, HDTV or higher. The input image signals can be from analog or digital sources or may be obtained from input sources that may be distributed over a network through desktop sharing or file transfer. The present invention relates to a user-friendly way of selecting the inputted computer, video and data input sources for display on the visualisation screen 16.

The image recombination system 24 may function as follows: each image 20, 22 is presented to the image recombination system 24 as a data-stream comprising consecutive lines of the images 20, 22. The recombined image comprises, for each $n^{th}$ line, data from the $n^{th}$ line of the first image 20 and data from the $n^{th}$ line of the second image 22. This combination of lines of data from the separate images 20, 22 into lines of data of the combined image is made inside the image recombination system 24. Basically, the two image formats are combined into 1 bigger image format, which is presented to the display. The whole screen is continuously and real time updated, so the update is not conditionally, i.e. the update is not for parts of the display only. The frame rate of the combined image that is fed to the display will usually be (but does not need to be) synchronous with the frame rate of 1 of the two inputted formats, for example with the frame rate of the first image format. If the second image format has a different frame rate, this second image format will be frame rate converted to match the frame rate of the first image format and of the combined image format that is combining both images for the display. Thus one or each input channel of the projection device of the present invention may include a frame converter, e.g. in block 24. It is possible that the combined image format is running asynchronously from both inputted image formats, in which case both inputted formats are frame rate converted using a frame converter to match the frame rate of the combined image format that is fed to the display. After both inputted image formats are frame rate matched to the combined image format that will be sent to the display, combining the pixel data of both images into the combined image format creates the combined image data. Basically the pixel data of each individual input image is mapped to the correct position in the combined image, thereby recalculating the correct pixel position for all pixels of the combined image. In both cases, the combined image being synchronous or asynchronous with at least one of the images, both images are displayed at the same frame rate.

The electronic image processing system may comprise a dual data line for computer or data images with a 1:1 resolution preservation, i.e. no downscaling nor upscaling of the image resolutions. At the end, both images are shifted into one big data image by image recombination techniques applied to the image signals in an image recombination system 24. The recombination of these two data streams may be done in an image recombination system 24 such as e.g. an Integrated Circuit (IC), an Application Specific IC (ASIC), or a Field Programmable Gate Array (FPGA), which combines both images e.g. into a 2050*1208-image format.

This 2050*1208-image format signal, for example, is then fed to the large image forming display device 18, e.g. LCD panel, and is projected onto the visualisation screen or projection screen 16 by means of a single projection lens 26. Because both images 28, 30 are projected by a single projection lens 26 in a single projection device 10, there is no risk of geometrical misalignment between the images 28, 30 because of geometrical distortion and neither for colour misalignment as is the case when one is using two separate projection systems next to each other as in the prior art.

The two images can be visually placed on the visualisation screen 16 either next to each other, horizontally, vertically or obliquely, or partially on top of each other.

It is also possible to combine different images of different native resolutions in one big image, e.g. SXGA+ and SVGA, XGA and SXGA, UXGA and XGA, and so on. The image processing electronics first measures characteristics of each of the inputted image signals 20, 22, such as for example resolution, blanking, total number of pixels, etc and then uses this data to accurately map the pixels of the inputted data files into the combined image format. If for example the first image comprises more lines than the second image, then blank lines (or black lines) may be added at the end of the second image when combining both images. Thus the image format of the final image may be greater than the sum of the image formats of the first and second images. Here again, the different images are displayed at the same frame rate in the final image.

The projection device 10 can be a single lamp system or a multiple lamp system, e.g., but not limited to, a two-lamp system, which fits better with the aspect ratio of the high resolution image forming device 18, and it can display video images as well as data images. Alternatively, the illumination can also happen with laser sources.

The present invention provides a user-friendly way of selecting at least two of a plurality of input sources, such as e.g. computer, video and/or data sources, for display on a visualisation screen 16. This selection, according to the present invention, may be done without the use of a remote control, as is the case on standard projection devices.

In order to obtain a user-friendly way of selecting at least two of a plurality of input sources, according to the present invention a processing unit 40 is built inside the projection device 10. As illustrated in FIG. 2, the processing unit 40 and the other projection electronics are integrated in a same housing 25. The processing unit 40, such as a microprocessor, a microcontroller or a reconfigurable programmable gate array for example, for controlling the projection device 10, is a piece of electronics that comprises a control unit (CU) and at least one processor element such as an arithmetic and logic unit (ALU). With a processing unit 40 is meant any processing device having an instruction set, and thus being able to receive commands and execute them. The CU controls the actions of the processing unit 40 and the ALU does the mathematical and logic functions. The CU is designed to accept instructions, decode them, and send appropriate signals to the ALU to execute the instruction. The processing unit 40 may include one or more processor elements such as a processor from the Motorola family of microprocessors or the MIPS family of microprocessors. In an alternative embodiment, processing unit 40 is specially designed hardware for controlling the operations of projection device 10. The processing unit 40 furthermore comprises at least one register, a graphical output chip or card 42 and a storage device (memory) such as e.g. a hard disc, a flash card or a RAM card. There are many different ways in which memory can be coupled to the system. Memory may be used for a variety of purposes such as, for example, caching and/or storing data, programming instructions etc. The program instructions may control the operation of an operating system and/or one or more applications, for example.

On the processing unit 40, an operating system is running, which can e.g. be Windows based or Linux based or can be any other suitable operating system. When acting under the control of appropriate software or firmware, the processing unit 40 may be responsible for implementing specific functions associated with the functions of the projection device 10. For example, the processing unit 40 may be responsible for moving an image on a visualisation screen 16. The processing unit 40 accomplishes the functions under the control of software including an operating system (e.g. Windows NT) and any appropriate applications software.

Through the graphical output chip or card 42, the operating system environment is output and shown, without any input sources being selected, on the visualisation screen 16 in a resolution the projection device can handle. This is illustrated in FIG. 3, where an image 50 of the operating system environment is shown. The processing unit 40 can consist of a single board computer (SBC) of can comprise a plurality of boards. As a particular example, not intended to be limiting, a 5.25" SBC may be used together with a 40 GB hard disc, Windows XP as operating system, the operating system being displayed through the graphical chip on the projection device in the native projector resolution of 2050× 1200 or an HDTV resolution in case of an HDTV projector (1920×1080).

The processing unit 40 has a link 44 with the image recombination system 24 for commanding these electronics. The processing unit 40 can either command the image recombination system 24 directly or indirectly through a separate CPU (not represented in the drawings) on the image recombination system 24 that is commanding it. This link 44 can be a serial link, like RS232, USB or any other suitable serial link, it can be an Ethernet link, or it can be a parallel link.

A user interacts with the projection device 10 through an indication device such as e.g. a mouse 46, a keypad (not represented) and/or a keyboard 48, which can be wireless, wired, Ethernet-connected or through desktop-sharing connected with the processing unit 40.

A dedicated program is installed on the processing unit 40, e.g. it may be stored on the storage device, loaded into memory and run on the processor element. The dedicated program has at least one, possibly a plurality or all, of the following characteristics:

1. The dedicated program adds a "my sources" menu 52 (name of the menu can be different) in the start bar 54 of the operating system (see FIG. 4). In the "my sources" menu 52, a list 56 of all possible connectable input sources is given. In the example shown in FIG. 4, the selectable input sources are a VCR, a DVD, a PC, a camera, a videoconference and satellite news, but these names can of course be different. A desired input source can be selected from the list 56 by means of the pointing device, e.g. by means of the mouse 46 or keyboard 48. Each input source is indicated with a name, e.g. VCR, DVD, My Laptop, My document camera, My video conference or Satellite news in the example given, which name can be customized by using the pointing device, e.g. by right clicking with the mouse 46 on the input source name.

Figure 4:
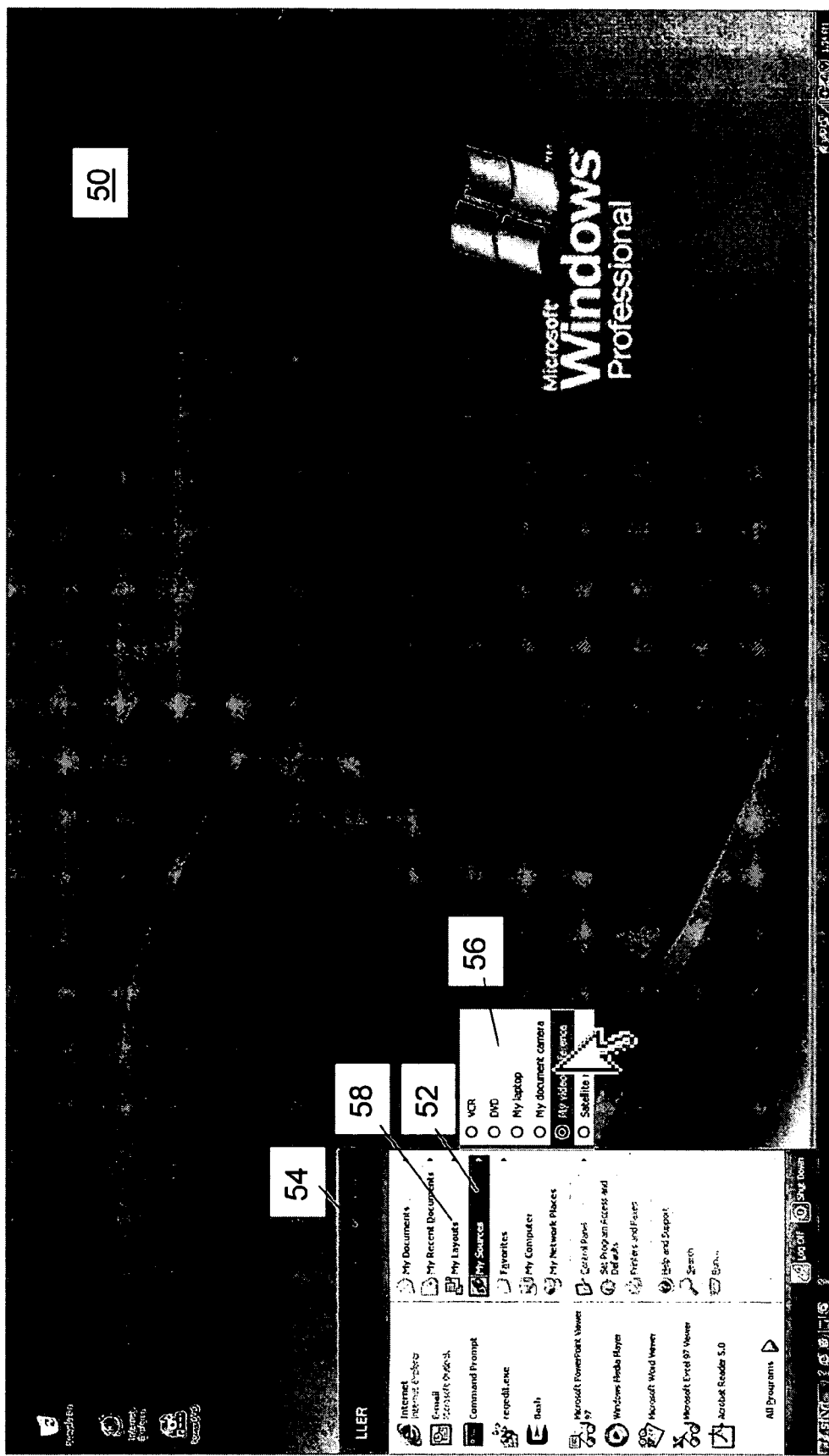
FIG. 4 shows a displayed image at the moment of selecting a first input source.
Figure 9:
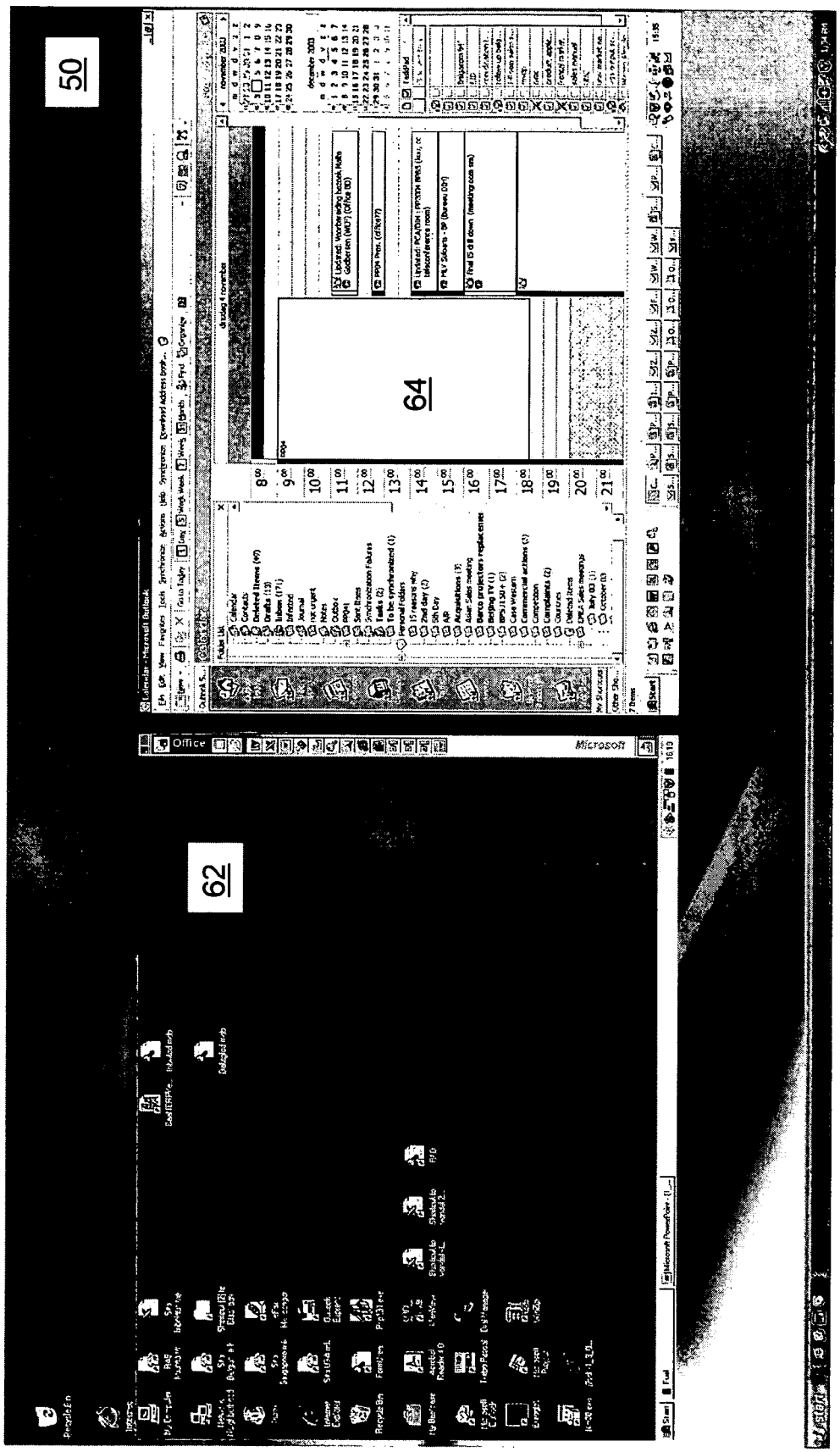
FIG. 9 shows a displayed image with the first and second input sources being moved towards a first and second desired position respectively.

2. The dedicated program adds a "my lay-outs" menu 58 (name of the menu can be different) in the start bar 54 of the operating system, as also illustrated in FIG. 4. In the "my lay-outs" menu 58, all the stored lay-outs can be found, which were saved as laid-out on the visualisation screen 16. This allows to select a previously saved lay-out, i.e. indicating where images from each of the selected input sources should be positioned, e.g. two images next to each other in the width of the visualisation screen (as illustrated in the configuration shown in FIG. 9), or one large image on the left hand side and two smaller images one below the other on the right hand side (not represented in the drawings).

3. The dedicated program allows the user to put a short cut on the desktop to a certain input source and/or a lay-out.

4. The dedicated program communicates with the image recombination system 24 over the link 44 from the processing unit 40, and it gives commands to control it.

5. The dedicated program translates movements of the pointing device, i.e. e.g. a corresponding mouse 46 or keyboard 48 cursor on the visualisation screen 16 into commands for the projection device electronics, so that the input sources can be manipulated like ordinary computer windows, as known nowadays by every PC user (among others, one can drag images from the input sources with the mouse 46 towards another location, minimize them, maximize them, change the size . . . ) in an operating system. The projection device electronics positions the images from the input sources over the operating system image 50, and lets them follow the mouse click or keyboard commands that are given by a user.

6. The dedicated program offers the possibility to display a windows-like frame around a displayed image source, with the appropriate windows control features, such as e.g. a minimise button, a resize button and a close button.

Figure 5:
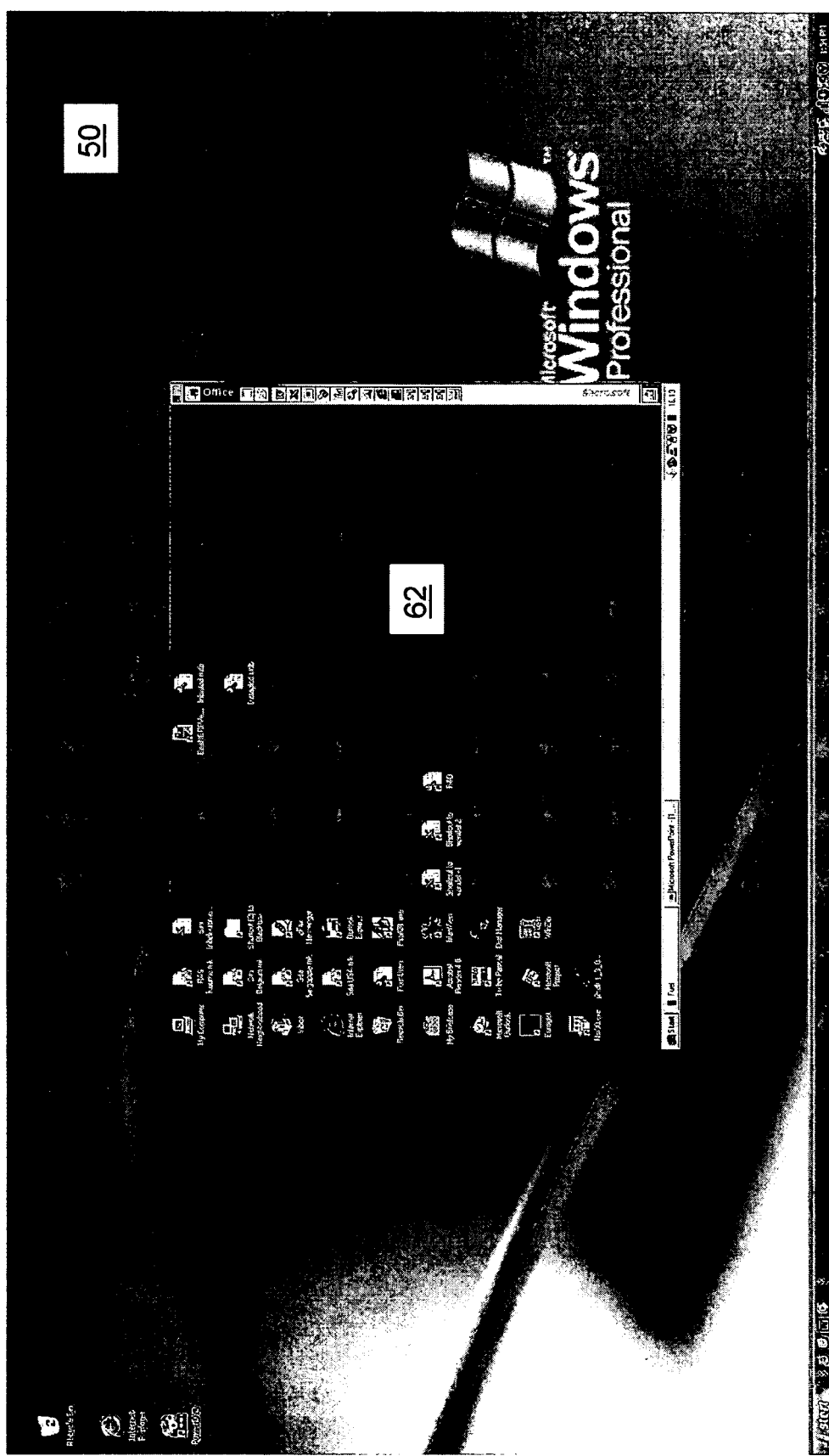
FIG. 5 shows a displayed image once the first input source has been selected.
Figure 6:
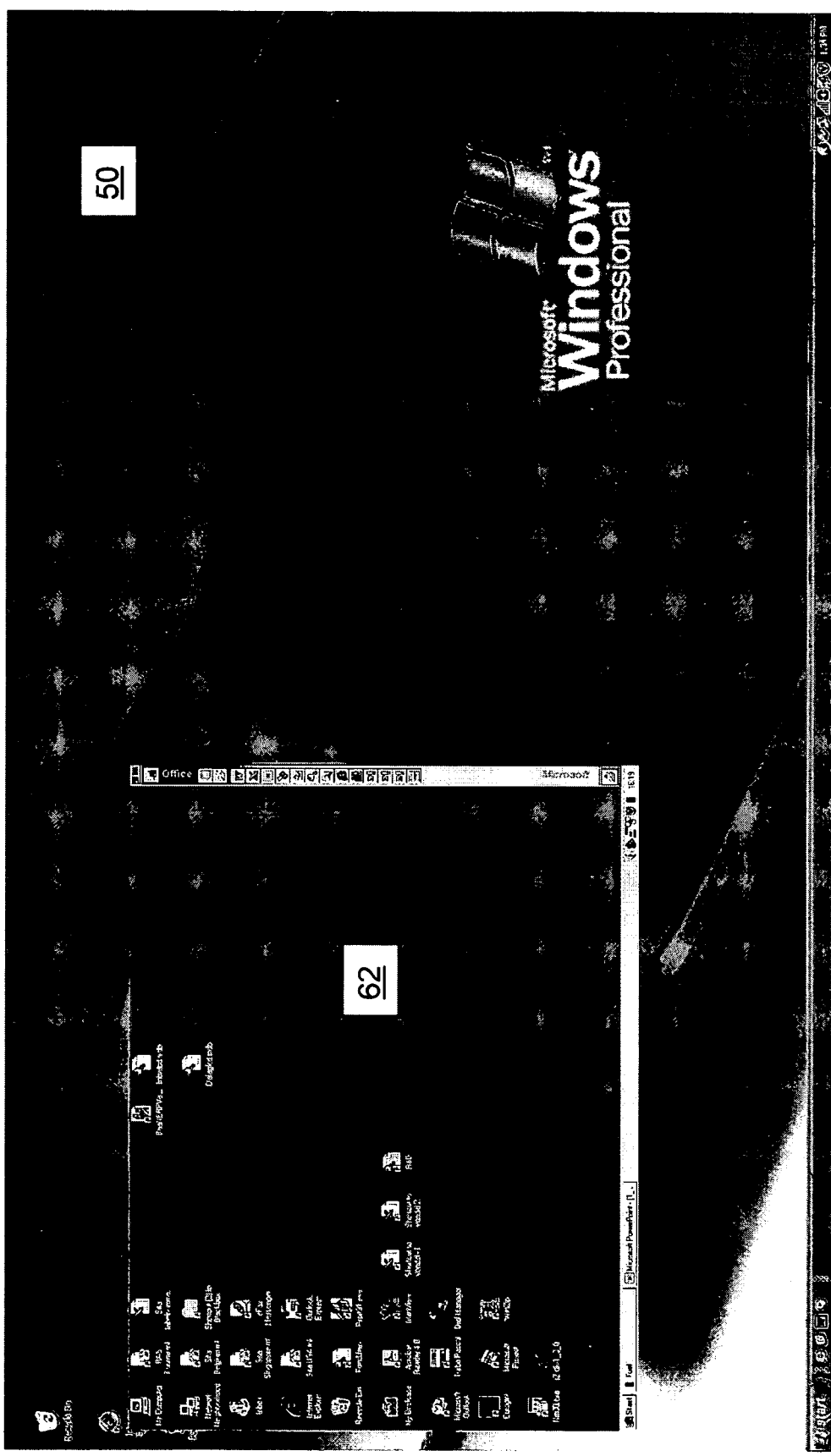
FIG. 6 shows a displayed image once the image of the first input source has been moved towards a first desired position.
Figure 7:
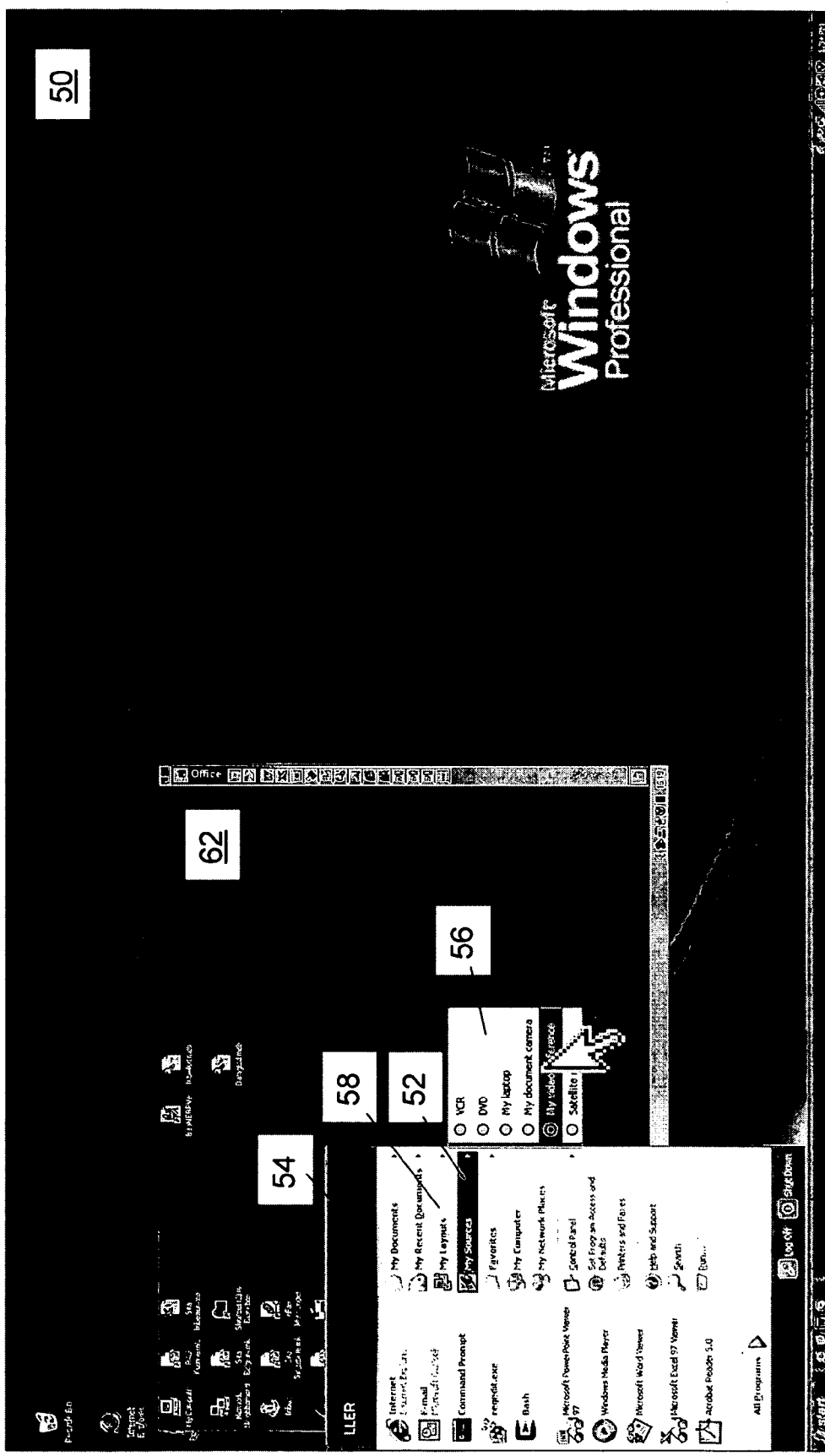
FIG. 7 shows a displayed image when the first input source has been selected and moved towards the first desired position, and with a second input source being selected.
Figure 8:
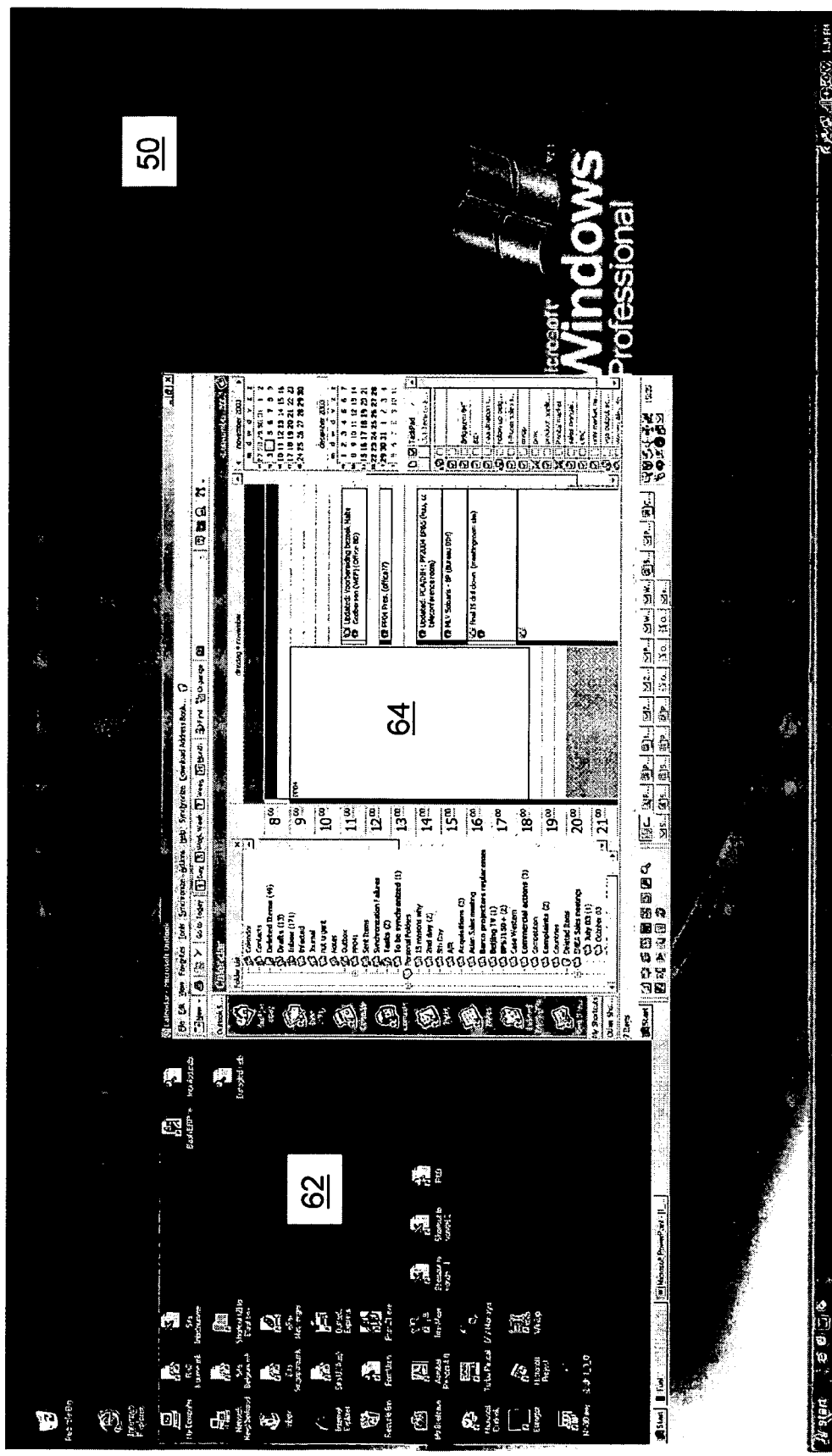
FIG. 8 shows a displayed image with the first and second selected input sources being displayed, one partially on top of the other.

In FIGS. 3 to 9, an example of the desktop integrated way of working according to an embodiment of the present invention is displayed, including selecting and adding input sources. When the projection system is started up, it displays the image 50 generated by the operating system running on the processing unit 40, as illustrated in FIG. 3. If the user wants to display a video, data or computer source, the user clicks the start button 60 with e.g. the mouse 46 and the start bar 54 appears. The user then clicks the "my sources" menu button 52 with the mouse 46 and all available input sources that are connected to the projection system are displayed in the list 56, as illustrated in FIG. 4. The names of these input sources can be modified by right clicking on the current name and typing in a new name. With the mouse 46, the user can select one input source, e.g. by clicking it with the mouse 46, and its corresponding image 62 will appear on the visualisation screen 16 over the image 50 of the operating system, as shown in FIG. 5. The user can then reposition or resize this first input image 62, e.g. with the mouse 46, and drag it to a place where the user likes it to be, as illustrated in FIG. 6. If the user then wants to add one or more additional sources, he can repeat this procedure, i.e. selecting a further input source, like it is shown in FIG. 7. Eventually, an image 64 from a second (or $3^{rd}$, or more) source is shown as in FIG. 8. With the help of the pointing device, e.g. the mouse 46, it is then possible to drag this newly inputted source image 64 to the place on the visualisation screen where the user wants it to be, see e.g. FIG. 9 with two images 62, 64 that the user wants to display next to each other.

All the above events can be triggered by using a pointing device in a very user-friendly way. There is no need for complicated remote controls, but e.g. state of the art mouse clicks or keyboard hits may be used for extensive manipulation of the displayed images from the input sources. Furthermore, images from any of the sources can be removed e.g. by mouse clicks and additional manipulations on the image source windows can be done by right clicking on these windows, and selecting one of the offered options that are displayed in the menu that appears. Al these options are provided in the dedicated program.

Once a lay-out on the visualisation screen 16 is created that is suitable, this lay-out can be saved by simply right clicking on the visualisation screen and selecting "save current lay-out" in the menu that is appearing (not represented in the drawings). This lay-out can afterwards be selected in the "My lay-outs" menu 58 in an analogous way as an input source is selected.

The user-friendly way of selecting input sources can be implemented on all projection systems that can display multiple sources, and in particular for projection systems as described in U.S. Ser. No. 10/330,943.

It is to be understood that although preferred embodiments, specific constructions, configurations and operating systems, as well as materials, have been discussed herein for devices according to the present invention, various changes or modifications in form and detail may be made without departing from the scope and spirit of this invention. For example, the image forming display device 18 inside the projection device 10 can be of a transmissive or reflective type, such as for example a polysilicon LCD, a DLP-chip, a DMD display, an LCOS device, a grating light valve display or an OLED display, as long as the resolution is sufficient for the application. The projection device 10 can either be a single display projector, a 2-display projector or a 3-display projector. The embodiments above have been explained for the combination of two images, but more than two images may be combined as well. Furthermore, these images do not need to be projected adjacent each other in the vertical direction, but can be projected adjacent each other in a horizontal direction or in an oblique direction, or can even be projected so as to (partially) overlap each other. Furthermore, the example given is for a high-resolution projection device with a high-resolution display device. However, the projection device may comprise a standard display device, in which case the image sources deliver low-resolution images, or, if they deliver high-resolution images, the resolution of these images is down-converted so as to enable fitting of the images on the display device.

What is claimed is:

1. An integrated projection device comprising:
   at least two first input ports for receiving at least a first and a second input image signal,
   an image recombination system for combining the input image signals into one imaging signal,
   a second input port for receiving user inputs,
   a processing unit adapted for running an operating system, the operating system being for commanding the image recombination system in accordance with received user inputs,
   an application program or service on the operating system or a plug in a media player on the operating system to be run on the processing unit, the application program or service or plug in having at least a first menu and a second menu, the first menu having means for allowing the user to select input image signals and the second menu having means for allowing the user to save a created lay-out of the imaging signal and to selecting a stored lay-out of the imaging signal,
   the integrated projection device further comprising:
   an image forming display device for displaying an image corresponding to the imaging signal, and
   a projection lens for projecting the imaged imaging signal onto a visualization surface.

2. A projection device according to claim 1, wherein at least one of the first input ports is for receiving a high resolution input image signal.

3. A projection device according to claim 1, wherein the image forming display device is a high resolution image forming display device.

4. A projection device according to claim 1, wherein the processing unit comprises a processor.

5. A projection device according to claim 4, wherein the processing unit furthermore comprises a memory.

6. A projection device according to claim 4, wherein the processing unit furthermore comprises a storage device.

7. A projection device according to claim 4, wherein the processing unit furthermore comprises a graphical output device.

8. A projection device according to claim 1, wherein the operating system is Windows based or Unix based.

9. A projection device according to claim 1, wherein the processing unit consists of a single board computer.

10. A projection device according to claim 1, wherein the processing unit comprises multiple boards.

11. A projection device according to claim 1, wherein the processing unit furthermore comprises a link for communicating with the image recombination system.

12. A projection device according to claim 11, wherein the image recombination system comprises an image recombination processing unit for receiving commands from the processing unit and for commanding the image recombination system.

13. A projection device according to claim 11, wherein the link is any of a serial link, a parallel link or an Ethernet link.

14. A projection device according to claim 1, wherein the first and second input image signal have information data for a first and a second display format, respectively, the first and the second display format comprising a first and a second image format respectively, and wherein the imaging signal has information data for a third display format, the third display format comprising a third image format.

15. A projection device according to claim 14, wherein the first and second input image signals have a first and a second image format, respectively and the imaging signal has a third image format which is larger than either the first or second image format.

16. A projection device according to claim 1, wherein the image forming display device is a wide aspect ratio flat panel device.

17. A projection device according to claim 1, wherein the image recombination system comprises a Field Programmable Gate Array.

18. A projection system with an integrated projection device and a visualization surface, the integrated projection device comprising:
   at least two first input ports for receiving at least a first and a second input image signal, an image recombination system for combining the input image signals into one imaging signal, a second input port for receiving user inputs, a processing unit adapted for running an operating system, the operating system being for commanding the image recombination system in accordance with received user inputs, an application program or service on the operating system or a plug in a media player on the operating system to be run on the processing unit, the application program or service or plug in having at least a first menu and a second menu, the first menu having means for allowing the user to select input image signals and the second menu having means for allowing the user to save a created lay-out of the imaging signal and for selecting a stored lay-out of the imaging signal, the integrated projection device further comprising:

an image forming display device for displaying an image corresponding to the imaging signal, an image forming display device for displaying an image corresponding to the imaging signal, and a projection lens for projecting the imaged imaging signal onto a visualisation surface.

19. A projection system according to claim 18, furthermore comprising an input device for inputting user inputs.

20. A projection system according to claim 19, wherein the input device is connected to the processing unit by a wired connection, a wireless connection, an Ethernet connection, or through desktop-sharing.

21. A projection system according to claim 18, wherein the first and second input image signals have a first and a second image format, respectively and the high resolution imaging signal has a third image format which is larger than either the first or second image formats.

22. A method for projecting multiple images adjacent each other, the method comprising:

receiving a user input, selecting at least a first and a second input image signal in accordance with a received user input, running an operating system for commanding input image signal combining means for combining the selected input image signals into one imaging signal, running an application program or service on the operating system or a plug in a media player on the operating system for producing at least a first menu and a second menu, the first menu allowing the user to select input image signals and the second menu allowing the user to save a created lay-out of the imaging signal and to select a stored lay-out of the imaging signal, running the application also for manipulating the input image signals in accordance with received user inputs, applying the imaging signal to an image forming display device, so as to obtain an intensity-modulated light beam corresponding to the imaging signal, and projecting the intensity-modulated light beam onto a projection surface.

23. A method according to claim 22, wherein running the operating system comprises running a Windows based or Linux based operating system.

24. A method according to claim 22, furthermore comprising projecting an operating system environment onto the projection surface.

25. A processing unit for use with an integrated projection device, the integrated projection device comprising means for receiving at least a first and a second input image signal, an image recombination system for combining the input image signals into one imaging signal, an image forming display device for displaying an image corresponding to the imaging signal, and a projection lens for projecting the imaged imaging signal onto a visualization surface, the processing unit being adapted for controlling the combining of the input image signals in accordance with received user inputs by running an operating system the integrated projection device further comprising:

an application program or service on the operating system or a plug in a media player on the operating system to be run on the processing unit, the application program or service or plug in having at least a first menu and a second menu, the first menu having means for allowing the user to select input image signals and the second menu having means for allowing the user to save a created lay-out of the imaging signal and for selecting a stored lay-out of the imaging signal.

* * * * *